United States Patent
Guha et al.

(10) Patent No.: US 7,434,097 B2
(45) Date of Patent: Oct. 7, 2008

(54) METHOD AND APPARATUS FOR EFFICIENT FAULT-TOLERANT DISK DRIVE REPLACEMENT IN RAID STORAGE SYSTEMS

(75) Inventors: Aloke Guha, Louisville, CO (US); Kelly E. Long, Broomfield, CO (US); James B. Lenehan, Erie, CO (US)

(73) Assignee: Copan System, Inc., Longmont, CO (US)

( * ) Notice: Subject to any disclaimer, the term of this patent is extended or adjusted under 35 U.S.C. 154(b) by 547 days.

(21) Appl. No.: 10/860,193

(22) Filed: Jun. 3, 2004

(65) Prior Publication Data
US 2004/0260967 A1 Dec. 23, 2004

Related U.S. Application Data

(60) Provisional application No. 60/475,904, filed on Jun. 5, 2003.

(51) Int. Cl.
*G06F 11/00* (2006.01)
(52) U.S. Cl. ............................................. 714/7
(58) Field of Classification Search .................. None
See application file for complete search history.

(56) References Cited

U.S. PATENT DOCUMENTS

| | | |
|---|---|---|
| 4,467,421 A | 8/1984 | White |
| 5,088,081 A | 2/1992 | Farr |
| 5,438,674 A | 8/1995 | Keele et al. |
| 5,530,658 A | 6/1996 | Hafner et al. |
| 5,557,183 A | 9/1996 | Bates et al. |
| 5,666,538 A | 9/1997 | DeNicola |
| 5,680,579 A | 10/1997 | Young et al. |
| 5,720,025 A | 2/1998 | Wilkes et al. |
| 5,727,144 A | 3/1998 | Brady |
| 5,787,462 A | 7/1998 | Hafner et al. |
| 5,805,864 A | 9/1998 | Carlson et al. |
| 5,828,583 A | 10/1998 | Bush et al. |
| 5,913,927 A | 6/1999 | Nagaraj et al. |
| 5,917,724 A | 6/1999 | Brousseau et al. |

(Continued)

OTHER PUBLICATIONS

Asaca/Shibasoku Corp of America, publication DM200', 1 page from www.asaca.com/DVL/DM_200.htm, Oct. 7, 2003.

(Continued)

*Primary Examiner*—Christopher S McCarthy
(74) *Attorney, Agent, or Firm*—Brian N. Young; Trellis IP Law Group, PC (57) ABSTRACT

An apparatus and a method for improving the fault tolerance of storage systems by replacing disk drives, which are about to fail, are disclosed. The set of disk drives in a storage system are monitored to identify failing disk drives. A processing unit identifies the failing disk drive and selects a spare disk drive to replace the failing disk drive. The selected spare disk drive is powered on, and data from the failing disk drive is copied to the selected spare disk drive. A memory unit stores attributes and sensor data for the disk drives in the storage system. The attributes and sensor data are used by the processing unit to identify a failing disk drive. Attributes for disk drives are obtained by using SMART, and sensor data is obtained from environmental sensors such as temperature and vibration sensors.

32 Claims, 7 Drawing Sheets

U.S. PATENT DOCUMENTS

| | | | |
|---|---|---|---|
| 5,961,613 A | 10/1999 | DeNicola | |
| 6,078,455 A | 6/2000 | Enarson et al. | |
| 6,128,698 A | 10/2000 | Georgis | |
| 6,401,214 B1* | 6/2002 | Li | 714/6 |
| 6,598,174 B1 | 7/2003 | Parks | |
| 6,600,614 B2 | 7/2003 | Lenny et al. | |
| 6,680,806 B2 | 1/2004 | Smith | |
| 6,735,549 B2 | 5/2004 | Ridolfo | |
| 6,771,440 B2 | 8/2004 | Smith | |
| 6,816,982 B2* | 11/2004 | Ravid | 714/20 |
| 6,892,276 B2* | 5/2005 | Chatterjee et al. | 711/114 |
| 6,957,291 B2 | 10/2005 | Moon et al. | |
| 6,959,399 B2* | 10/2005 | King et al. | 714/6 |
| 6,982,842 B2 | 1/2006 | Jing et al. | |
| 6,986,075 B2* | 1/2006 | Ackaret et al. | 714/4 |
| 7,035,972 B2* | 4/2006 | Guha et al. | 711/114 |
| 7,107,491 B2 | 9/2006 | Graichen et al. | |
| 7,210,005 B2 | 4/2007 | Guha et al. | |
| 7,266,668 B2 | 9/2007 | Hartung et al. | |
| 2002/0007464 A1 | 1/2002 | Fung | |
| 2002/0062454 A1 | 5/2002 | Fung | |
| 2002/0144057 A1 | 10/2002 | Li et al. | |
| 2003/0196126 A1 | 10/2003 | Fung | |
| 2003/0200473 A1 | 10/2003 | Fung | |
| 2004/0006702 A1 | 1/2004 | Johnson | |
| 2004/0054939 A1 | 3/2004 | Guha | |
| 2004/0111251 A1 | 6/2004 | Trimmer et al. | |
| 2004/0153614 A1 | 8/2004 | Bitner et al. | |
| 2005/0060618 A1* | 3/2005 | Guha | 714/54 |
| 2005/0177755 A1 | 8/2005 | Fung | |
| 2005/0210304 A1 | 9/2005 | Hartung | |
| 2005/0268119 A9* | 12/2005 | Guha et al. | 713/300 |
| 2006/0053338 A1 | 3/2006 | Cousins | |
| 2006/0075283 A1* | 4/2006 | Hartung et al. | 714/5 |
| 2006/0090098 A1* | 4/2006 | Le et al. | 714/6 |
| 2007/0028041 A1* | 2/2007 | Hallyal et al. | 711/114 |
| 2007/0220316 A1 | 9/2007 | Guha et al. | |

OTHER PUBLICATIONS

Colarelli et al., The Cas for Massive Arrays of Idle Disks (MAID),' Dept of Computer Science, Univ. of Colorado, Boulder, pp. 1-6, Jan. 7, 2002.

Patterson et al., "A Case for Redundant Arrays of Inexpensive Disks (RAID)," ACM, pp. 109-116, 1998.

Chase et al., "Managing Energy and Server Resources in Hosting Centers," Dept of Computer Science, Duke University, pp. 14, Oct. 2001.

Calce and The University of Maryland; Reliability of Hard Disk Drives (HDD); © 2003; pp. 1-2; www.calce.umd.edu.

Herbst, Jim; SMART Specification For Seagate Technology Desktop and Mobile Drives Version 2.28; Apr. 23, 2003; pp. 1-36.

S.M.A.R.T Design Desktop HDD Development IDE HDD Development Storage M & D; Jul. 12, 2002; IBM Corporation.

Weikal, Adam et al.; Maxtor Self-Monitoring, Analysis and Reporting Technology/ Drive Self Test (SMART/ DST) User's Guide; Revision C; May 1, 2002; pp. 1-52.

* cited by examiner

METHOD AND APPARATUS FOR EFFICIENT FAULT-TOLERANT DISK DRIVE REPLACEMENT IN RAID STORAGE SYSTEMS

REFERENCE TO RELATED APPLICATIONS

This application claims the priority of U.S. Provisional Patent Application No. 60/475,904, entitled "Method and Apparatus for Efficient Fault-tolerant Disk Drive Replacement in RAID Storage Systems" by Guha, et al., filed Jun. 5, 2003, which is hereby incorporated by reference in its entirety.

BACKGROUND

The present invention relates generally to the field of storage systems. More particularly, the present invention relates to increasing the fault tolerance of RAID storage systems.

Storage systems are used to store data. The amount of data that is being stored by storage systems is increasing rapidly. To cope up with the increasing amount of data being stored, storage systems combine a large number of independent disk drives. These disk drives are organized as a Redundant Array of Independent Disks (RAID).

RAID storage systems can store a large amount of data. To store large amounts of data, they use a number of disk drives. Each disk drive has a fixed service life. The failure of a drive can be defined as its inability to store and retrieve data reliably. The failure of any one drive in a RAID system will result in the failure of the RAID storage system as a whole. Since RAID systems use data redundancy, data loss due to the failure of the storage system is avoided. The probability of the failure of such a RAID system can be quite high. This is because the probability of the failure of such a RAID system is the sum of probabilities of the failures of all individual disk drives in the system.

Since the probability of the failure of a RAID storage system is a function of the number of disk drives in the system, many RAID storage systems are organized into a number of smaller RAID sets. Each RAID set comprises a small number of disk drives. If one disk drive in a RAID set fails, it does not cause the loss of availability of data in the RAID storage system.

RAID storage systems support fault tolerance to disk drive failures, and therefore prevent loss of data in the case of disk drive failure. Fault tolerance is provided by either mirroring data onto a mirrored disk drive, or using one or more parity disk drives to store parity information for data stored on the other disk drives in the RAID set. In the event of the failure of a disk drive, the mirrored disk drive is used to restore lost data, or the parity disk drive is used to regenerate lost data by Exclusive ORing the data on the remaining drives in the RAID set. In the event of the failure of a disk drive in a RAID set, the RAID set goes critical. However, a critical RAID set will not cause loss of data, but there will be loss of data if another disk drive in the critical RAID set fails.

One approach to increase fault tolerance in RAID storage systems is to provide an additional parity drive in each RAID set. If one drive in a RAID set fails, the RAID set does not become critical, and the additional parity drive can be used to reconstruct data. Another approach of increasing fault tolerance is to mirror the entire RAID set. However, these approaches suffer from an increased drive overhead due to multiple writes of the same data. Another disadvantage is the decreased usable or effective storage capacity, defined as the ratio of the number of drives used for user data to the total number of drives in the RAID system.

In order to increase fault tolerance to multiple drive failures and increase data availability, RAID storage systems migrate data from a failing disk drive to a spare disk drive before the disk drive completely fails. One such system is described in U.S. Pat. No. 6,598,174, titled "Method and Apparatus for Storage Unit Replacement in Non-redundant Array", assigned to Dell Products L.P. This patent describes a storage system in which data from disk drives that are about to fail is migrated onto a spare disk drive. This system uses an intermediate disk drive to migrate the data onto a spare disk drive. Additionally, this system is applicable to a non-redundant array, such as a RAID 0 configuration. The system uses Self Monitoring Analysis and Reporting Technology (SMART) that is provided with disk drives to predict drive failure. A description of SMART can be found in the paper titled "Improved Disk Drive Failure Warnings" by Hughes, et al, published in IEEE transactions on reliability, September, 2002, pages 350-357.

Another system that employs data migration before drive failure, to increase fault tolerance, is described in U.S. Pat. No. 5,727,144 titled "Failure Prediction for Disk Arrays", assigned to International Business Machines Corporation. This patent describes a system that copies data from a failing disk drive to a spare disk drive. In case the disk drive fails before the entire data is copied, the system uses RAID regeneration techniques to reconstruct lost data.

However, the systems described above do not entirely solve the problem of maintaining fault tolerance in the case of multiple drive failures in a RAID set. The spare drives, which are used to replace a failed disk drive, are kept in power-on condition until required. This reduces the expected service life of the spare disk drive, making it susceptible to failure and increases its vulnerability to data loss. These systems only use the SMART feature of disk drives to predict drive failure but not to extend the service life of the drives. From the foregoing discussion, it is clear that there is a need for a system that increases the fault tolerance, and resulting data availability in RAID storage systems. The system should be able to predict the failure of a disk drive, using multiple sources so that it can reduce the possibility of the RAID sets becoming critical. The system should provide a high ratio of usable to total RAID storage capacity. This system should also be able to efficiently manage power to the spare disk drives that are used to replace failed disk drives in a RAID storage system.

SUMMARY

An object of the present invention is to increase fault tolerance and the resulting data availability of storage systems, by proactively replacing disk drives before their failure.

Another object of the present invention is to increase the ratio of the usable storage capacity to the total storage capacity of a storage system by powering on a spare disk drive only after a disk drive has been identified as failing.

Yet another object of the present invention is to proactively monitor drive attributes, such as those reported by SMART, and environmental sensor data.

The present invention is directed towards an apparatus and method for increasing the fault tolerance of RAID storage systems. The present invention is embodied within a storage controller of a RAID storage system. The apparatus comprises a first set of disk drives, that are constantly monitored to identify failing disk drives; a second set of disk drives, that are used to replace failing disk drives; a processing unit that identifies failing disk drives, and replaces these failing disk drives with disk drives selected from the second set of disk drives; and a memory unit that stores drive attributes obtained from the disk drives and sensor data. The processing unit further comprises a drive replacement logic unit and a drive control unit. The drive replacement logic unit identifies a failing disk drive from the first set of disk drives, based on drive attributes stored in the memory, and initiates drive replacement. The drive control unit powers on a second disk drive selected from the second set of disk drives, to replace the failing disk drive.

The second disk drive that is selected to replace a failing disk drive is not powered on until drive replacement is initiated. Data is copied from the failing disk drive to the second disk drive. Once all data is copied, the failing disk drive can be powered off and marked for replacement.

The present invention increases the ratio of usable storage capacity to the total storage capacity of the storage system, because the spare disk drives are not powered on and are not a part of the storage system until replacement is initiated. Additionally, this increases the service life of spare disk drives, since they are powered off until the time they are added to the RAID system. This also reduces the power consumption of the storage system. Since data is copied from a failing disk drive to a second disk drive, additional performance overheads for regeneration of data, using RAID parity techniques, are also reduced.

BRIEF DESCRIPTION OF THE DRAWINGS

The preferred embodiments of the invention will hereinafter be described in conjunction with the appended drawings, provided to illustrate and not to limit the invention, wherein like designations denote like elements, and in which.

DESCRIPTION OF PREFERRED EMBODIMENTS

For the sake of convenience, the terms used to describe the various embodiments are defined below. It should be noted that these definitions are provided to merely aid the understanding of the description, and that they in no way limit the scope of the invention.

RAID—RAID is a storage architecture that enables high-capacity, high-speed data transfer at a low cost. A description of RAID can be found in the paper titled "A Case for RAID" by Patterson, et al, International Conference on Management of Data (1988), pages 109-116.

Power-on State—In this state, power is supplied to a device. The device may not be in use, but it is consuming power. In the case of disk drives, a drive in power-on state is continuously spinning but data may or may not be read from or written onto it.

Power-off State—In this state, power is not supplied to a device and the device is in an inactive state. In the case of disk drives, no power is supplied to a drive in the power-off state.

Spare Drive—A spare drive is a disk drive that is not being currently used for any data read/write operations and is kept to replace a disk drive that has failed or has been predicted to fail. It may be in a power-on or a power-off state.

The disclosed invention is directed to a method and system for achieving fault tolerance in a storage system, by the replacement of failing disk drives. The replacement is carried out before a disk drive in the system completely fails. Conditions leading to the failure of a disk drive are detected, in order to carry out the replacement of the disk drive before its failure.

Figure 1:
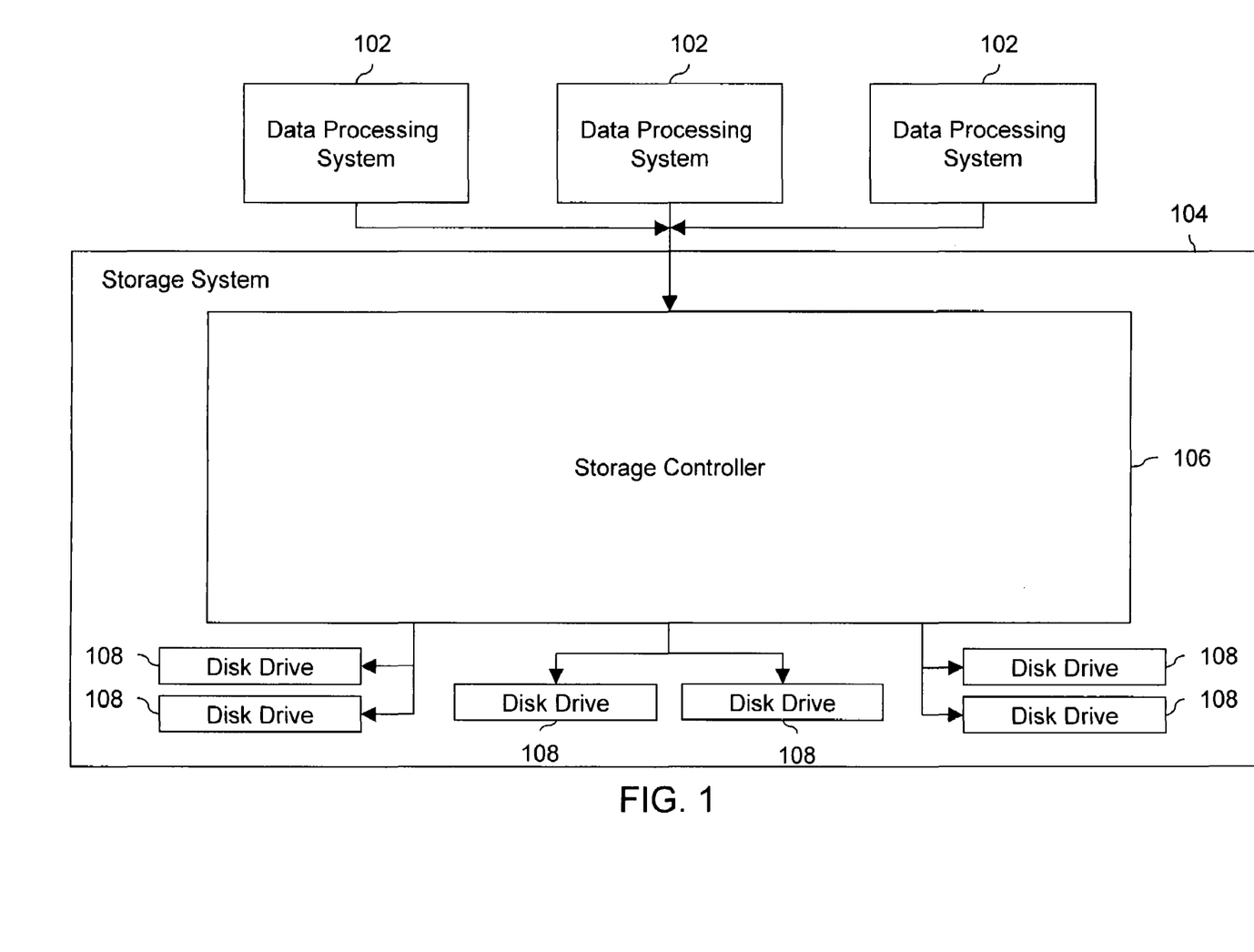
FIG. 1 is a block diagram of an exemplary storage system and its environment, in accordance with an embodiment of the present invention.

FIG. 1 is a block diagram of an exemplary storage system and its environment, in accordance with an embodiment of the present invention. One or more data processing systems 102 are connected to a storage system 104. Data-processing systems 102 can be in the form of computer servers, stand-alone desktop computers, PCs, workstations and the like. Data-processing systems 102 can be connected to storage system 104, using a network or other suitable interconnect means. Storage system 104 comprises a storage controller 106 and one or more disk drives 108. Disk drives 108 can be in the form of magnetic disk drives, tape drives, optical drives and the like. The examples of a data-processing system, means of connecting data processing systems to a storage system and disk drives cited here are only for illustrative purposes and do not limit the scope of the invention, as will be apparent to one skilled in the art.

Figure 2:
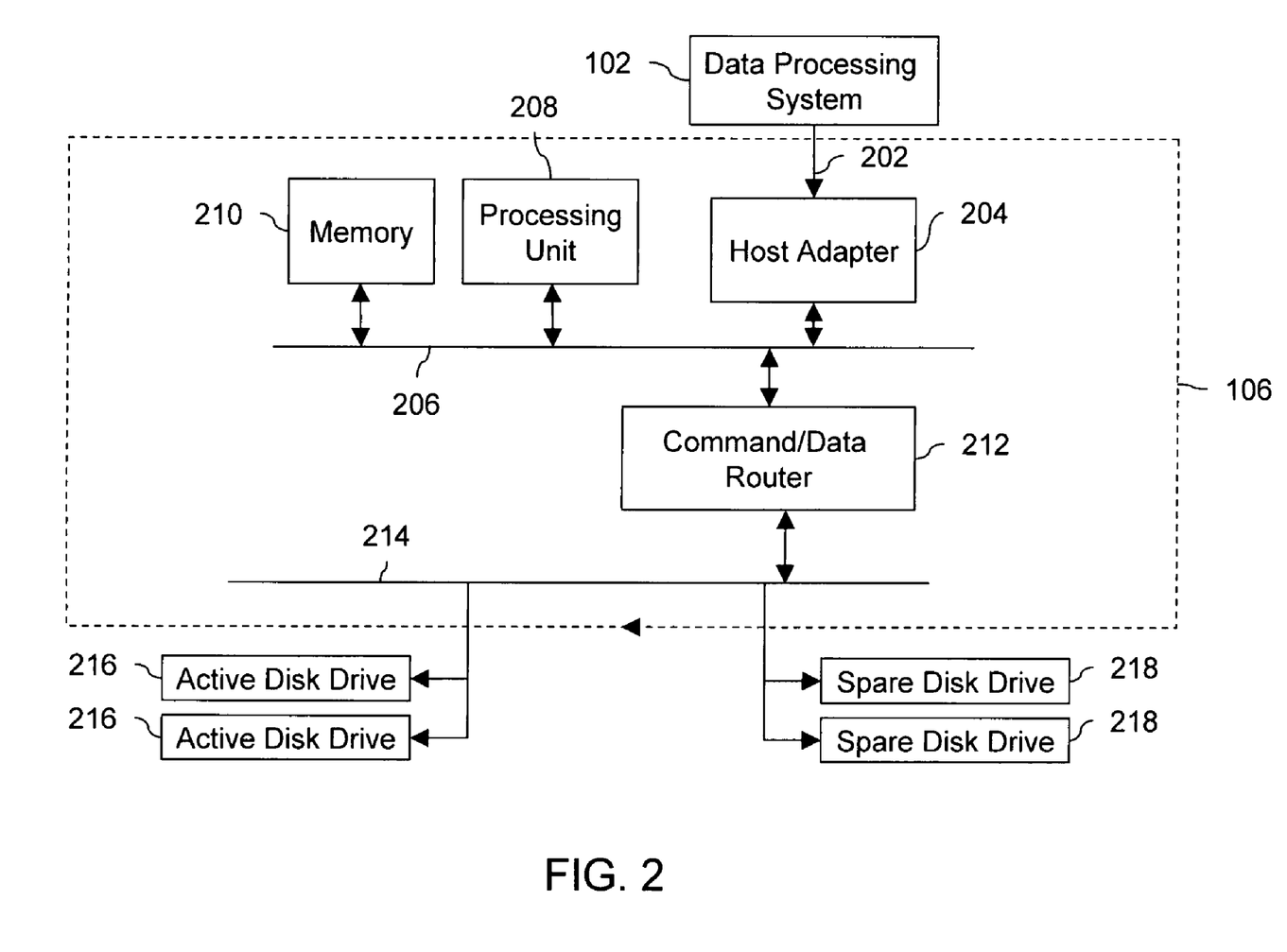
FIG. 2 is a block diagram of an exemplary storage controller 106, in accordance with an embodiment of the present invention.

FIG. 2 is a block diagram of an exemplary storage controller 106, in accordance with an embodiment of the present invention. One or more data-processing systems 102 are connected by means of host interface 202 to host adapter 204. Examples of host interfaces include Fibre Channel Interfaces, as well as SCSI and SATA interfaces. Host adapter 204 serves as a physical interface between data-processing systems 102 and storage controller 106. Host adapter 204 is connected by means of a bus or switched interconnect 206 to a processing unit 208, a memory 210, and a command/data router 212. Processing unit 208 processes storage operations such as processing input/output (I/O) requests from data-processing systems 102, and translates them into I/O requests for data. Disk drives 108 (as shown in FIG. 1) are organized into two groups, active disk drives 216 and spare disk drives 218. Active disk drives 216 are used to store data, maintain parity data, or act as mirrors for other active disk drives 216. Spare disk drives 218 are used to replace active disk drives 216 before or after failure. Processing unit 208 is also used to send data from data-processing systems 102 to one or more disk drives 108. Processing unit 208 is encoded with instructions to provide RAID functionalities such as data striping, data mirroring and data parity protection. Additionally, processing unit 208 predicts the failure of an active disk drive and selects a spare disk drive to replace the active disk drive before the failure of the active disk drive.

Command/data router 212 is used as an interface between processing unit 208 and active disk drives 216 and spare disk drives 218. This interface may be in the form of a switch or a bus interconnect. Command/data router 212 routes the I/O requests and the data to be written on disk drive 108, specified by processing unit 208. Therefore, command/data router 212 connects a plurality of disk drives 108 to a plurality of data-processing systems 102.

Figure 3:
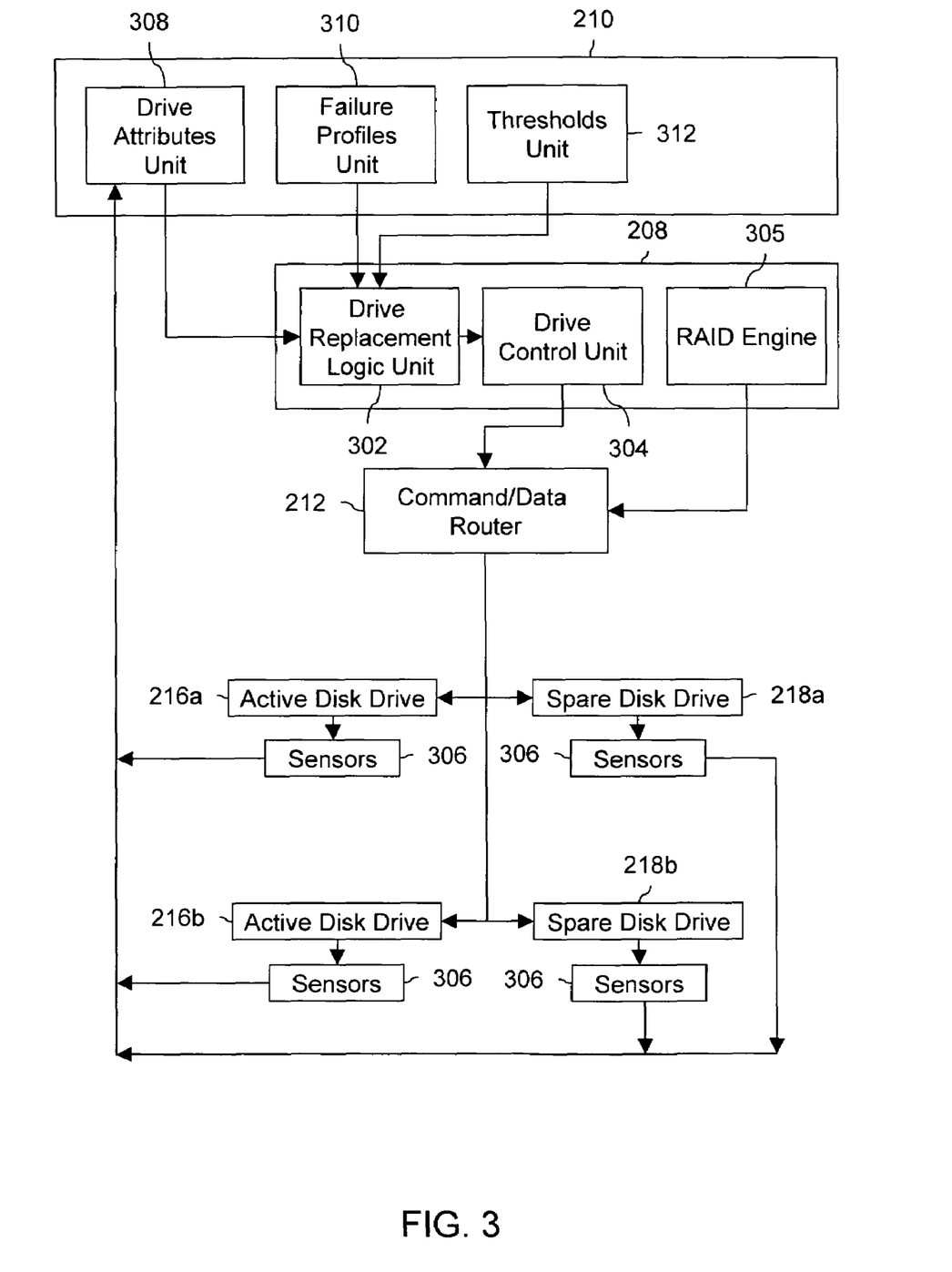
FIG. 3 is a block diagram of the functional elements of a fault-tolerant RAID storage system, in accordance with an embodiment of the present invention.

FIG. 3 is a block diagram of the functional elements of a fault-tolerant RAID storage system, in accordance with an embodiment of the present invention. Processing unit 208 comprises a drive replacement logic unit 302, a drive control unit 304 and a RAID engine 305. Drive replacement logic unit 302 predicts the failure of active disk drives 108a. Once a first disk drive 216b, the active disk drive predicted to fail, is identified, drive replacement logic unit 302 sends a signal to drive control unit 304 to initiate a process to replace first disk drive 216b with a second disk drive 218b. Second disk drive 218b is selected by drive replacement logic unit 302 from a list of available spare disk drives 218. It will be apparent to one skilled in the art that other methods of selecting the second disk drive from a pool of available disk drives are also possible without deviating from the scope of the invention. Drive control unit powers on second disk drive 218b and copies data from first disk drive 216b to second disk drive 218b. After all the data from first disk drive 216b has been copied onto the second disk drive 218b, second disk drive 218b is used for all future data transfer operations. RAID engine 305 performs the functions of data striping, data mirroring, RAID parity generation, data reconstruction using RAID parity techniques, etc. In an embodiment of the present invention, first disk drive 216b is powered off and marked for replacement. In another embodiment of the present invention, first disk drive 216b is used in conjunction with second disk drive 218b until first disk drive 216b completely fails. First disk drive 216b is then marked for replacement. In another embodiment of the present invention, storage system 104 supports hot swap and first disk drive 216b is manually removed from storage system 104 and replaced by a working disk drive.

Drive replacement logic unit 302 determines if one of the active disk drives 216 is going to fail. This decision is based on a number of factors, such as drive health statistics and the number of hours the drives have been in use. Drive health statistics include drive temperature, vibration, number of remapped sectors, error counts, access time to data, data throughput and read/write errors. Storage system 104 uses sensors 306 to monitor temperature and vibrations in the vicinity of active disk drives 216 and spare disk drives 218. Sensors 306 also include sensors for monitoring temperature and vibrations, such as a sensor to monitor the operation status of cooling fans to indicate the temperature of active disk drives 216 and spare disk drives 218. It should be apparent to one skilled in the art that other means of obtaining disk drive health statistics are also possible and do not limit the scope of the invention. A drive attributes unit 308 scans data from sensors 306 continually or periodically. In an embodiment of the present invention, drive attributes unit 308 also scans drive health statistics using the hard drive industry standard "Self Monitoring Analysis and Reporting Technology" (SMART), which is integrated in active disk drives 216 and spare disk drives 218. A failure profiles unit 310 keeps track of expected failure rates and failure profiles of the active disk drives 216 and spare disk drives 218. The expected failure rates and failure profiles determine the time to failure of active disk drives 216. They are calculated based on attributes that include number of power-on hours, predicted mean time to failure (MTTF), temperature of active disk drives 216 and number of start-stops of active disk drives 216. It will be apparent to one skilled in the art that other attributes can also be used to calculate expected failure rates and failure profiles, without deviating from the scope of the invention. Threshold unit 312 stores data relating to the threshold limits of active disk drives 216 and spare disk drives 218. This data includes drive temperature thresholds, limits for error counts, limits for data throughput rates, limits on access time to data, etc. The threshold values can change with time and the operation of active disk drives 216 and spare disk drives 218. For example, if a drive operates at an elevated temperature, which is below the threshold limit for that drive, the MTTF for that particular drive is reduced from that expected at a lower temperature. This is because usage of that drive at elevated temperatures increases the probability of the failure of that drive at temperatures below the threshold limit.

Drive replacement logic unit 302 uses information provided by drive attributes unit 308, failure profiles unit 310 and thresholds unit 312, to determine if a drive is nearing failure and if it needs replacement before it actually fails. Drive replacement unit 302 sends a signal to drive control unit to power-on a spare drive, copy data from the failing drive to the spare drive, and replace the failing drive.

Figure 4:
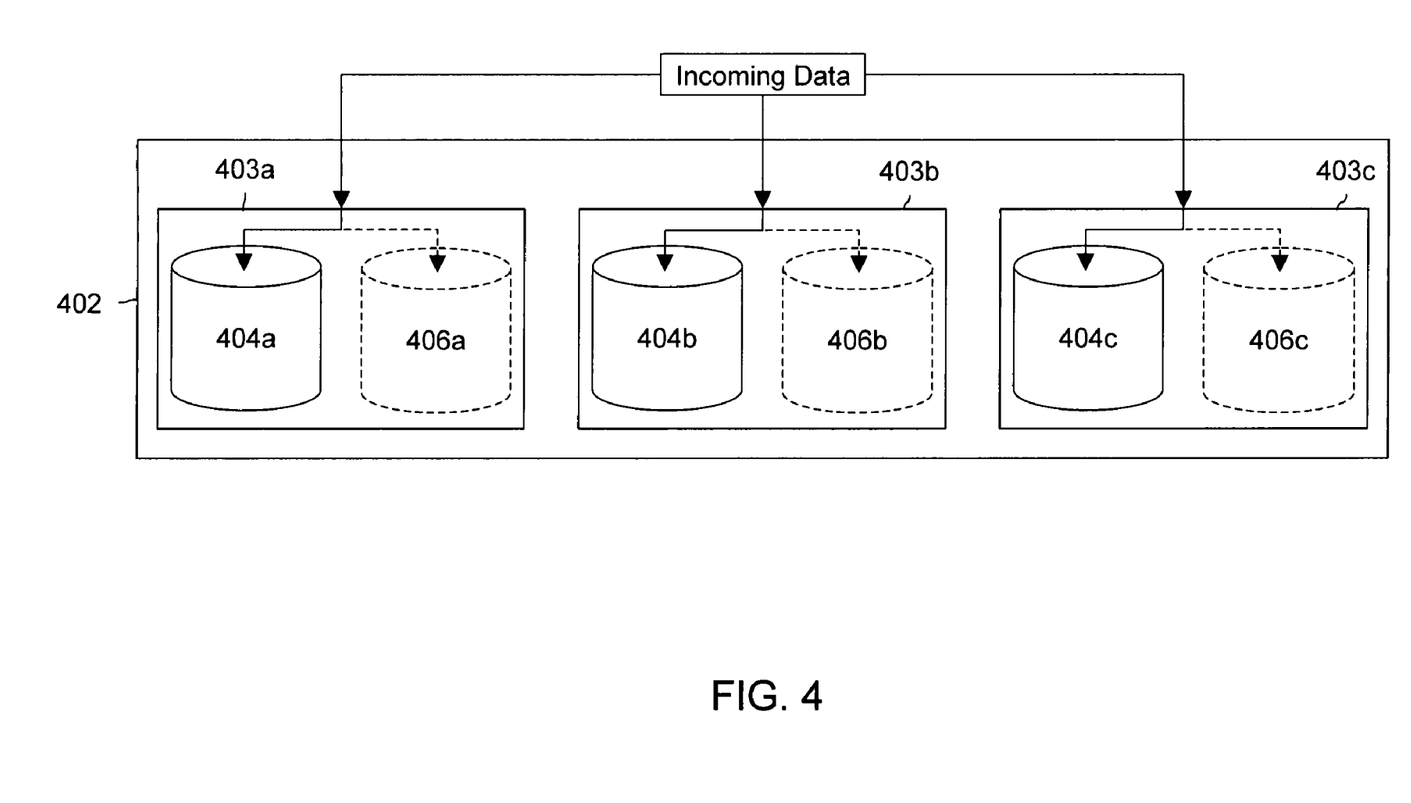
FIG. 4 is a block diagram of an exemplary RAID level-5 set with spare disk drives, in accordance with an embodiment of the present invention.

In an embodiment of the present invention, active disk drives 216 and spare disk drives 218 are arranged to form RAID sets or arrays. FIG. 4 is a block diagram of an exemplary RAID level-5 set with spare disk drives, in accordance with an embodiment of the present invention. RAID set 402 comprises mirror sets 403a, 403b and 403c. Each mirror set 403 comprises an active disk drive 404 and a spare disk drive 406. It should be apparent to one skilled in the art that the number of mirror sets 403, active disk drives 404 and spare disk drive 406 in RAID set 402, as shown in FIG. 4, is for exemplary purposes only and does not limit the scope of the invention. Spare disk drive 406 is used to mirror data on active disk drive 404, but is not a part of RAID set 402 until the failure of active disk drive 404 is predicted. Since spare disk drive 406 is not a part of RAID set 402, normally RAID set 402 would be critical if a drive in the RAID set 402 fails. However, spare disk drives 406 are added to mirror sets 403 before the actual failure of disk drives 402 so that RAID set 402 functions in a non-critical state. For exemplary purposes, it is considered that active disk drive 404a is predicted to fail. Spare disk drive 406a is selected from the available spare disk drives 108b. Spare disk drive 406a is powered-on, added to mirror set 403a, and data from active disk drive 404a is copied to spare disk drive 406a. It should be apparent to one skilled in the art that the RAID level-5 set is for exemplary purposes only and the invention is not limited to a RAID level-5 data organization.

Figure 5:
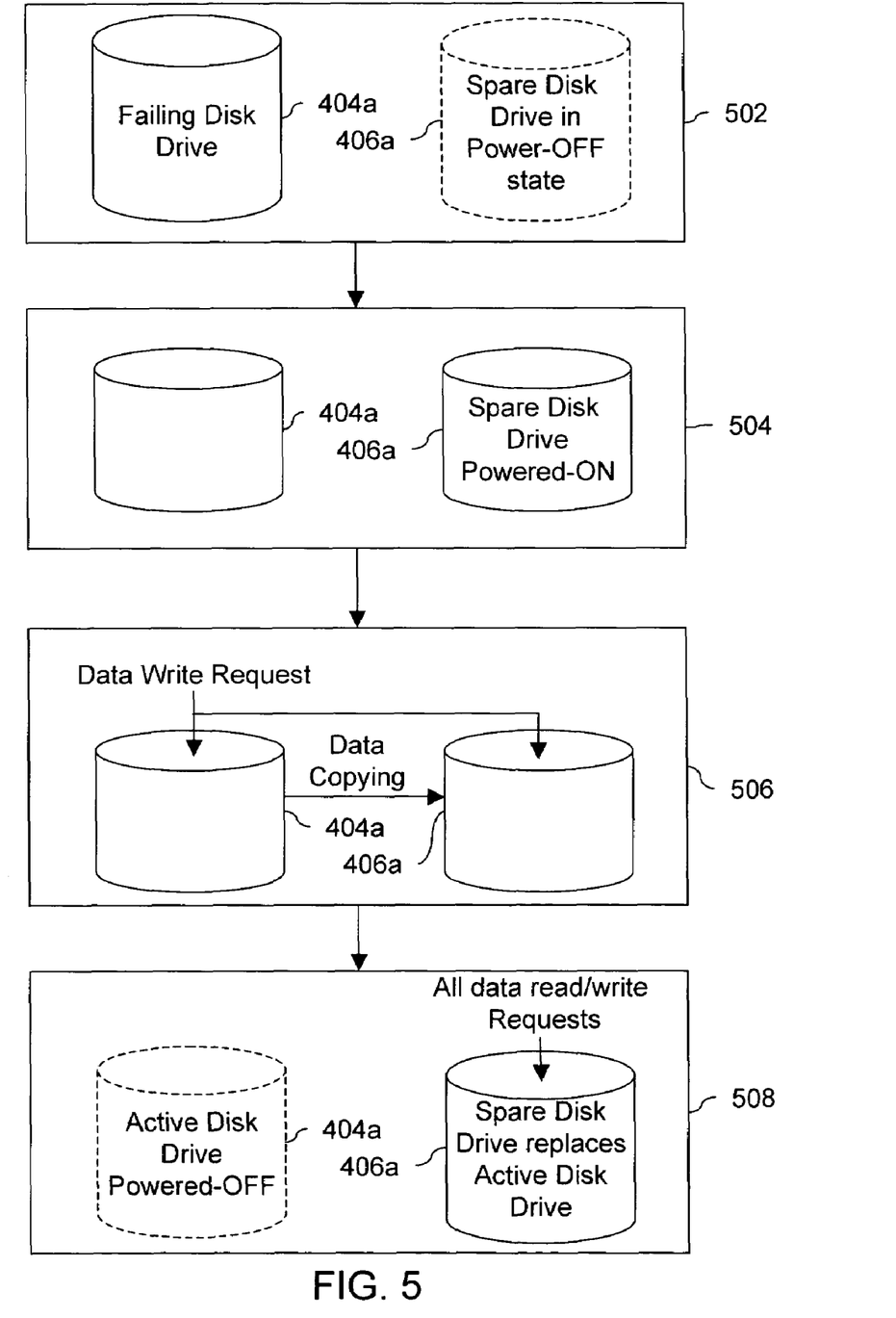
FIG. 5 illustrates the steps performed to replace a failing disk drive with a spare disk drive, in accordance with an embodiment of the present invention.

FIG. 5 illustrates the steps performed for replacing a failing disk drive with a spare disk drive, in accordance with an embodiment of the present invention. At step 502, the failure of active disk drive 404a is predicted. At this stage, spare disk drive 406a is not a part of mirror set 403a. At step 504, spare disk drive 406a is powered-on and added to mirror set 403a. At step 506, data from active disk drive 404a is copied onto spare disk drive 406a. During this step, all data write operations that are directed to active disk drive 404a are also mirrored to spare disk drive 406a. Any read operations are directed to active disk drive 404a only because the requested data may not be available on spare disk drive 406a. After the copying of the data is complete, spare disk drive 406a is made active, at step 508. In an embodiment of the present invention, active disk drive 404a is powered-off and removed from RAID set 402. In another embodiment, active disk drive 404a functions along with spare disk drive 406a until active disk drive 404 fails. After failure, active disk drive 404a is marked for manual removal from storage system 104.

Figure 6:
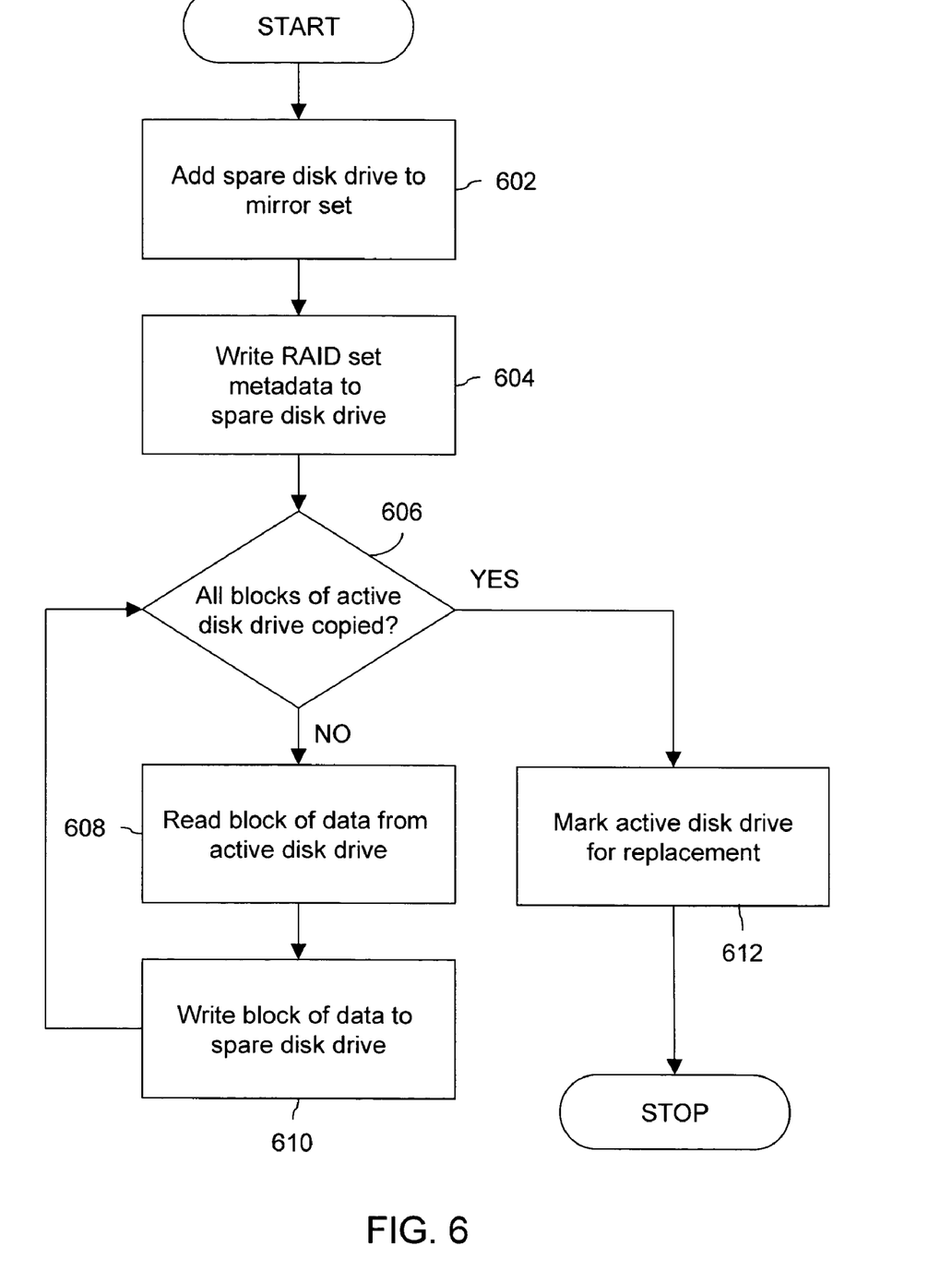
FIG. 6 is a flowchart of the steps performed for replacing a failing disk drive, and copying data from the failing disk drive to a spare disk drive, in accordance with an embodiment of the present invention.

In order to replace a failing disk drive, data has to be copied from the failing disk drive to a spare disk drive. FIG. 6 is a flowchart of the steps performed to replace a failing disk drive and copying data from the failing disk drive to a spare disk drive, in accordance with an embodiment of the present invention. At step 602, spare disk drive 406a is added to mirror set 403a. At step 604, mirror set metadata is written to spare disk drive 406a. Mirror set metadata includes information that indicates the active disk drive 404a, or spare disk drive 406a are members of RAID set 402 and the logical address of active disk drive 404a or spare disk drive 406a within storage system 104. Steps 606, 608 and 610 are iteratively performed to copy data from active disk drive 404a, to spare disk drive 406a. At step 606, it is checked if all the blocks from active disk drive 404a have been copied onto spare disk drive 406a. If the copying is not complete, then at step 608, a block of data is read from active disk drive 404a. At step 610, the read block of data is written to spare disk drive 406a. The location on the spare disk drive to which the block of data is written is the same as its location on active disk drive 404a. Once all the blocks of data on active disk drive 404a have been written to spare disk drive 406a, step 612 is performed. At step 612, active disk drive 404a is marked for replacement from storage system 104. It will be apparent to one skilled in the art that other methods of synchronization of data between active disk drive 404a and spare disk drive 406a are also possible, without deviating from the scope of the invention.

Figure 7:
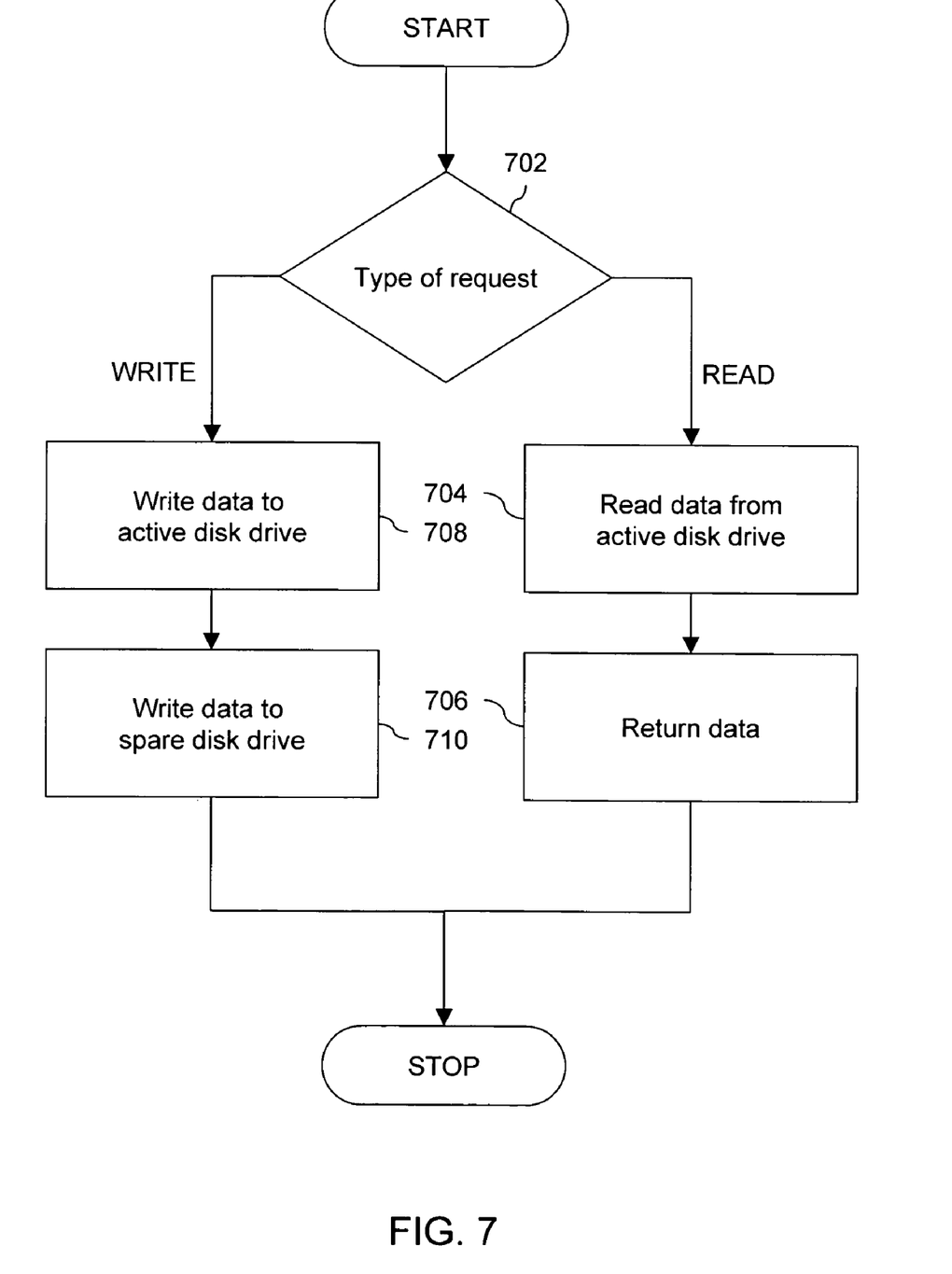
FIG. 7 is a flowchart of the steps performed for processing read and write requests for data on an active disk drive during the replacement of an active disk drive by a spare disk drive, in accordance with an embodiment of the present invention.

During the process of the replacement of active disk drive 404a with spare disk drive 406a, a data write or read requests may be directed to active disk drive 404a. FIG. 7 is a flowchart of the steps performed for processing read and write requests for data on the active disk drive during the replacement of the active disk drive by a spare disk drive, in accordance with an embodiment of the present invention. At step 702, the type of request is identified. If the request is a read request, i.e., request for data to read from active disk drive 404a (as shown in FIG. 4), then steps 704 and 706 are performed. At step 704, the requested data is read from active disk drive 404a. At step 706, the read data is returned to the requesting data processing system. If the request is a write request, i.e., a request for writing data on active disk drive 404a, then steps 708 and 710 are performed. At step 708, the data is written on active disk drive 404a. At step 710, the data is also written on spare disk drive 406a. Only write requests are directed to both drives, whereas the read requests are only directed to active disk drive 404a. This is because the data to be read might not be available on spare disk drive 406a at the time the request is received.

In one embodiment, the present invention is implemented in a power-managed RAID. Power-managed RAID has been described in co-pending US Patent Publication number 20040054939, published on Mar. 18, 2004, titled "Method and Apparatus for Power-efficient High-capacity Scalable Storage System", assigned to Copan Systems, Inc. This publication is incorporated herein by reference. Disk drives 108 are power managed. This means that they are switched on only when data read/write requests are directed to the disk drives. When such a power-managed disk drive is predicted to fail, it is powered on along with the selected spare disk drive that will replace it, and data is copied from the power-managed disk drive to the selected spare disk drive. The spare disk drive is also power managed, and if no read/write requests are directed to it for a long time, the power-managed spare disk drive is powered off.

In another embodiment, the present invention is implemented in an n-way mirror of mirrors. In an n-way mirror of mirrors, n drives are mirrors of one another. In such an arrangement, multiple disk drives store a copy of the data stored on a primary drive. If the failure of the primary drive or any one of the multiple disk drives is predicted, a spare can be powered on to replace the failing disk drive.

In another embodiment, the present invention is implemented in an existing RAID storage system. If the RAID storage system supports the creation of bi-level arrays, then the present invention can be implemented by making the spare disk drives appear as virtual disk drives to the RAID storage system. Virtual spare disk drives are not actually present in a bi-level array or mirror set, but appear as if present to the RAID storage system. The RAID storage system directs data transfer to both drives in the mirrored set. However, data is actually written only to the active disk drive, and data directed to the virtual spare disk drive is not saved on the disk drive. A software layer is created to handle these I/O requests and ensures that the virtual spare disk drive is not powered on and allocated to a mirror set until the failure of an active disk drive is predicted.

In another embodiment of the present invention, if a failing disk drive fails before all the data from the failing disk drive is copied onto a spare disk drive or if a disk drive fails without warning and its replacement cannot be initiated, RAID engine 305 uses RAID parity regeneration techniques to regenerate the data which has not been copied to the spare disk drive. It will be apparent to one skilled in the art that alternate techniques of regeneration of data are also possible without deviating from the scope of the invention.

An advantage of the present invention is that spare disk drives are not powered on until the failure of a disk drive is predicted. This increases the service life of spare disk drives because they are not in operation during the time period when active disk drives are functioning without errors. Hence, the number of failures of spare disk drives is reduced. Another advantage of the present invention is that no data reconstruction, using RAID regeneration techniques, is required because data is copied from a failing drive before its failure. This reduces the performance overheads caused by regeneration of data. Another advantage of the present invention is that the ratio of available storage capacity to total storage capacity is high, because spare disk drives are not in use until the failure of an active disk drive is predicted. Yet another advantage of the present invention is that multiple failing disk drives can be replaced in parallel. The system also consumes less power, generates less heat and vibrations. This is also due to the fact that spare disk drives are not always in a power-on condition.

While the preferred embodiments of the invention have been illustrated and described, it will be clear that the invention is not limited to these embodiments only. Numerous modifications, changes, variations, substitutions and equivalents will be apparent to those skilled in the art, without departing from the spirit and scope of the invention, as described in the claims.

What is claimed is:

1. An apparatus for improving fault tolerance of a storage system, the apparatus comprising:
   a. a first set of disk drives;
   b. a second set of disk drives, the second set of disk drives in power-off condition;
   c. a processing unit, the processing unit comprising:
      i. a drive replacement logic unit, the drive replacement logic unit identifying a potential failing disk drive from the first set of disk drives that has not failed yet;
      ii. a drive control unit, the drive control unit receiving an indication from the drive replacement logic unit to replace the potential failing disk drive with a spare disk drive from the second set of disk drives, the drive control unit powering-on the spare disk drive before the potential failing disk drive fails to replace the potential failing disk drive; and d. a data copying mechanism to copy data to the powered-on spare disk drive, the data being a copy of data stored on the potential failing disk, wherein data copying mechanism stores data received by the storage system to the potential failing disk drive and to the spare disk drive.

2. The apparatus as recited in claim 1, wherein the processing unit comprises a RAID engine, the RAID engine performing data striping, data mirroring and parity functions.

3. The apparatus as recited in claim 1, wherein the first and second set of disk drives are individually controllable to power on or off independent of the remainder of disk drives.

4. The apparatus as recited in claim 1, wherein the first set of disk drives form one or more RAID sets.

5. The apparatus as recited in claim 1, wherein a memory unit comprises: a. a drive attributes unit, the drive attributes unit receiving and storing disk drive attribute data from each disk drive from of the first set of disk drives; b. a failure profile unit, the failure profile unit storing failure profiles for each disk drive from the first set of disk drives; and c. a threshold unit, the threshold unit storing attribute thresholds for various health factors for the first set of disk drives, the attribute thresholds indicating levels above which disk drives from the first set of disk drives are likely to fail.

6. The apparatus as recited in claim 5 further comprising at least one environmental sensor.

7. The apparatus as recited in claim 6, wherein the environmental sensors comprise at least one temperature sensor, the temperature sensor monitoring temperature of at least one disk drive from the first set of disk drives.

8. The apparatus as recited in claim 6, wherein the environmental sensors comprise at least one vibration sensor, the vibration sensor monitoring vibrations of at least one disk drive from the first set of disk drives.

9. The apparatus as recited in claim 6, wherein the memory unit receives drive attribute data from at least one environmental sensor.

10. The apparatus as recited in claim 5, wherein the memory unit receives drive attributes data from the first set of disk drives.

11. The apparatus as recited in claim 10, wherein the drive attributes data is received using the SMART standard.

12. The apparatus of claim 1, wherein the data copying mechanism is configured to send write operations for new data directed to the potential failing disk drive to the powered-on spare disk drive.

13. A processing unit for improving fault tolerance of a storage system, the storage system comprising
a first set of disk drives storing data and a second set of disk drives, the processing unit comprising:
a. a drive replacement logic unit, the drive replacement logic unit identifying a potential failing disk drive from the first set of disk drives that has not failed yet;
b. a drive control unit, the drive control unit receiving an indication from the drive replacement logic unit to replace the potential failing disk drive with a spare disk drive from the second set of disk drives, the drive control unit powering-on the spare disk drive before the potential failing disk drive fails to replace the potential failing disk drive; and
c. a data copying mechanism to copy data to the powered-on spare disk drive, the data being a copy of data stored on the potential failing disk, wherein data copying mechanism stores data received by the storage system to the potential failing disk drive and to the spare disk drive.

14. The processing unit as recited in claim 13, wherein the storage system comprises a RAID system.

15. The processing unit as recited in claim 13, wherein each of the first and second set of disk drives are individually controllable to power on or off independent of the remainder of disk drives.

16. The processing unit as recited in claim 13, wherein the first set of disk drives are arranged form one or more RAID sets.

17. The processing unit as recited in claim 13, farther comprising a memory unit.

18. The processing unit as recited in claim 17, wherein the memory unit comprises: a. a drive attributes unit, the drive attributes unit receiving and storing disk drive attribute data from each disk drive from of the first set of disk drives; b. a failure profile unit, the failure profile unit storing failure profiles for the first set of disk drives; and c. a threshold unit, the threshold unit storing attribute thresholds for various health factors for the first set of disk drives.

19. The processing unit as recited in claim 18 further comprising at least one environmental sensor.

20. The processing unit as recited in claim 19, wherein the environmental sensors comprise at least one temperature sensor, the temperature sensor monitoring temperature of at least one disk drive from the first set of disk drives.

21. The processing unit as recited in claim 19, wherein the environmental sensors comprise at least one vibration sensor, the vibration sensor monitoring vibrations of at least one disk drive from the first set of disk drives.

22. The processing unit as recited in claim 19, wherein the memory unit receives drive attribute data from at least one environmental sensor.

23. The processing unit as recited in claim 18, wherein the memory unit receives drive attribute data from the first set of disk drives.

24. The processing unit as recited in claim 18, wherein the drive attribute data is received using the SMART standard.

25. The processing unit of claim 13, wherein the data copying mechanism is configured to send write operations for new data directed to the potential failing disk drive to the powered-on spare disk drive.

26. A method for improving fault tolerance of a storage system, the storage system comprising a first set of disk drives and a second set of disk drives in power-off condition, the method comprising the steps of:
monitoring the first set of disk drives to identify a potential failing disk drive from the first set of disk drives;
powering-on a spare disk drive from the second set of disk drives on receipt of signal before the potential failing disk drive fails to replace the potential failing disk drive from the first set of disk drives; and
copying data to the spare disk drive from the second set of disk drives, the data being a copy of data stored on the potential failing disk drive, wherein copying data further comprises storing data received by the storage system to the potential failing disk drive and to the spare disk drive.

27. The method as recited in claim 26, wherein the step of monitoring the first set of disk drives farther comprises the steps of: a. receiving information regarding temperature and vibrations of the first set of disk drives; b. receiving drive status information from the first set of disk drives; and c. comparing the received information to identify a failing drive.

28. The method as recited in claim 26 further comprising the step of adding the spare disk drive to the first set of disk drives.

29. The method as recited in claim 26 further comprising the step of removing the failing disk drive from the first set of disk drives.

30. The method as recited in claim 29 further comprising the step of powering off the potential failing disk drive after copying data from the potential failing disk drive to the spare disk drive replacing the failing disk drive.

31. The method as recited in claim 26, wherein the step of copying data further comprises the step of reading data requested by the storage system from the potential failing disk drive.

32. The method of claim 26, wherein the data copying mechanism is configured to send write operations for new data directed to the potential failing disk drive to the powered-on spare disk drive.

* * * * *